(12) United States Patent
Rietdorf et al.

(10) Patent No.: US 10,975,960 B2
(45) Date of Patent: Apr. 13, 2021

(54) DUAL CLUTCH CONTROL SYSTEM FOR INTEGRAL TORQUE CONVERTER AND RETARDER AND METHOD THEREOF

(71) Applicant: ALLISON TRANSMISSION, INC., Indianapolis, IN (US)

(72) Inventors: Michael Rietdorf, Indianapolis, IN (US); Charles F. Long, Zionsville, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 65 days.

(21) Appl. No.: 16/392,140

(22) Filed: Apr. 23, 2019

(65) Prior Publication Data

US 2019/0323567 A1    Oct. 24, 2019

Related U.S. Application Data

(60) Provisional application No. 62/677,388, filed on May 29, 2018, provisional application No. 62/661,692, filed on Apr. 24, 2018.

(51) Int. Cl.
| | | |
|---|---|---|
| *F16H 61/14* | (2006.01) | |
| *F16D 48/06* | (2006.01) | |
| *F16H 45/02* | (2006.01) | |

(52) U.S. Cl.
CPC ......... *F16H 61/143* (2013.01); *F16D 48/062* (2013.01); *F16H 45/02* (2013.01);
(Continued)

(58) Field of Classification Search
CPC .......... F16H 61/14; F16H 61/0202–2061/026; F16H 61/143–2061/147
See application file for complete search history.

(56) References Cited

U.S. PATENT DOCUMENTS 3,007,313 A * 11/1961 Snoy ............ F16H 61/58
60/343
3,326,065 A * 6/1967 Murphy .......... F16H 47/06
74/733.1

(Continued)

FOREIGN PATENT DOCUMENTS

JP         62165064 A * 7/1987

OTHER PUBLICATIONS http://voith.com/corp-en/braking-system/turbo-retarder-clutch-viab.html.

*Primary Examiner* — Ernesto A Suarez
*Assistant Examiner* — James J Taylor, II
(74) *Attorney, Agent, or Firm* — Taft Stettinius & Hollister LLP; Stephen F. Rost

(57) ABSTRACT

A transmission system includes a fluid-coupling device, an electro-hydraulic control system, and a clutch. The fluid-coupling device includes an input coupled to an impeller, an output coupled to a turbine, and a stator disposed between the impeller and the turbine. The electro-hydraulic control system includes a flow valve disposed in fluid communication with the input and the output of the fluid-coupling device that is movable between at least a first position and a second position, at least one trim valve system fluidly coupled to the flow valve, and a solenoid disposed in fluid communication with the flow valve that is electrically controllable between an energized state and a de-energized state. The clutch is disposable in fluid communication with the flow valve and controllable between an applied position and an unapplied position.

19 Claims, 8 Drawing Sheets

(52) U.S. Cl.
CPC ........ *F16D 2500/1027* (2013.01); *F16D 2500/1045* (2013.01); *F16D 2500/3082* (2013.01); *F16D 2500/70426* (2013.01); *F16D 2500/70484* (2013.01); *F16H 2045/0215* (2013.01); *F16H 2061/145* (2013.01)

(56) References Cited

U.S. PATENT DOCUMENTS

| | | | | |
|---|---|---|---|---|
| 3,901,030 | A * | 8/1975 | Wonn | F16H 61/62 |
| | | | | 60/341 |
| 4,704,922 | A * | 11/1987 | Suketomo | F16H 61/58 |
| | | | | 475/120 |
| 5,305,663 | A * | 4/1994 | Leonard | F16H 61/0009 |
| | | | | 475/123 |
| 5,566,801 | A | 10/1996 | Fukunaga et al. | |
| 8,225,915 | B2 | 7/2012 | Ames et al. | |
| 8,527,169 | B2 | 9/2013 | Long et al. | |
| 8,939,859 | B2 * | 1/2015 | Jawalkar Nagaraj | F16H 41/04 |
| | | | | 475/35 |
| 9,441,720 | B2 * | 9/2016 | Furcoiu | F16H 45/02 |
| 10,718,417 | B2 * | 7/2020 | Wentworth | F16H 41/24 |
| 2004/0134735 | A1 | 7/2004 | Klement et al. | |
| 2011/0011689 | A1 * | 1/2011 | Sakamoto | F16H 61/143 |
| | | | | 192/3.3 |
| 2011/0132709 | A1 * | 6/2011 | Fukunaga | F16H 41/24 |
| | | | | 192/3.23 |

\* cited by examiner

DUAL CLUTCH CONTROL SYSTEM FOR INTEGRAL TORQUE CONVERTER AND RETARDER AND METHOD THEREOF

CROSS-REFERENCE TO RELATED APPLICATIONS

The present application claims priority to, and the benefit of, U.S. Provisional Application Ser. No. 62/661,692, entitled "DUAL CLUTCH CONTROL SYSTEM FOR INTEGRAL TORQUE CONVERTER AND RETARDER AND METHOD THEREOF," which was filed on Apr. 24, 2018, and U.S. Provisional Application Ser. No. 62/677,388, which was filed on May 29, 2018, the disclosures of which are hereby incorporated by reference in their entirety.

FIELD OF THE DISCLOSURE

The present disclosure relates, generally, to a torque converter for use with a transmission system, and, more particularly, to a torque converter capable of functioning like a retarder in certain applications.

BACKGROUND

In a conventional vehicle or work machine, a retarder is a braking device used to control vehicle speed during vehicle operation. For example, a retarder may slow vehicle speed or assist with maintaining a steady or constant speed of the vehicle while descending a hill. In other words, a retarder is controllable to prevent the vehicle from accelerating quickly as it travels down a moderate or steep decline.

A conventional retarder may be very expensive due to complex castings of a stator, rotor, and housing thereof. It also may require its own control system. Moreover, a vehicle equipped with a retarder may require a larger vehicle cooler or, in some instances, a second cooler to help cool the hydraulic fluid within the housing. An accumulator may also be required to help move fluid into a rotor cavity of the retarder, particularly as retarders may be slow to respond during operation. Even with an accumulator, a slow response time may often be found with retarders.

Thus, there is a need for a device to perform a retarding function but to do so in a manner that achieves a quicker response time, requires less hardware, and is more cost effective.

SUMMARY

The present disclosure may comprise one or more of the following features and combinations thereof.

According to one aspect of the present disclosure, a transmission system may include a fluid-coupling device, an electro-hydraulic control system, a clutch, and a control circuit. The fluid-coupling device may be coupled between a drive unit and a transmission, and the fluid-coupling device may include an input coupled to an impeller, an output coupled to a turbine, and a stator disposed between the impeller and the turbine. The electro-hydraulic control system may be configured to distribute hydraulic fluid to a plurality of friction devices. The electro-hydraulic control system may include a flow valve disposed in fluid communication with the input and the output of the fluid-coupling device that is movable between at least a first position and a second position, at least one trim valve system fluidly coupled to the flow valve, and a solenoid disposed in fluid communication with the flow valve that is electrically controllable between an energized state and a de-energized state. The clutch may be disposable in fluid communication with the flow valve, and the clutch may be controllable between an applied position and an unapplied position. The control circuit may be disposed in electrical communication with the at least one trim valve system and the solenoid, and the control circuit may be configured to control operation of the solenoid between the energized state and the de-energized state. When the solenoid is controlled in the energized state by the control circuit, the flow valve may be disposed in the second position such that the flow valve is de-coupled from the clutch and the clutch is in the unapplied position. When the solenoid is controlled in the de-energized state by the control circuit, the flow valve may be disposed in the first position such that the flow valve is fluidly coupled to the clutch and the clutch is in the applied position. When the clutch is in the applied position, the clutch may resist rotation of the stator.

In some embodiments, when the clutch is in the unapplied position, the stator may be free to rotate. Additionally, in some embodiments, the fluid-coupling device may have a Kfactor characteristic that is function of a speed of the impeller and a torque of the impeller during operation of the fluid-coupling device, and the control circuit may be configured to modulate fluid pressure provided to the clutch to adjust the Kfactor characteristic. The control circuit may be configured to slip the clutch to adjust the Kfactor characteristic.

In some embodiments, the transmission system may further include a sensor coupled to the control circuit and configured to detect a rotational direction of an output of the transmission system, and the control circuit may be configured to control the solenoid between the energized state and the de-energized state based on the rotational direction of the output detected by the sensor. In response to detection of a reverse rotational direction of the output by the sensor, the control circuit may be configured to control the solenoid between the energized state and the de-energized state to control operation of the clutch between the applied position and the unapplied position in order to reduce rotational movement of the output.

In some embodiments, the clutch may be internally disposed in the fluid-coupling device, and the fluid-coupling device may include a second clutch disposable in fluid communication with the flow valve. The second clutch may be controllable between an applied position, in which the second clutch couples the impeller and the turbine to one another for rotation at approximately the same speed, and an unapplied position, in which the impeller and the turbine are not coupled to one another by the second clutch for rotation at approximately the same speed. The flow valve may be a multiplexing valve that allows operation of only one of the clutch and the second clutch in the applied position at any one time. When the flow valve is disposed in the first position, the second clutch may be in the unapplied position. When the flow valve is disposed in the second position, the second clutch may be in the applied position.

According to another aspect of the present disclosure, a method of operating a transmission system, the transmission system including (i) a fluid-coupling device having an input coupled to an impeller, an output coupled to a turbine, and a stator disposed between the impeller and the turbine, (ii) an electro-hydraulic control system having a flow valve disposed in fluid communication with the input and the output of the fluid-coupling device that is movable between at least a first position and a second position, at least one trim valve system fluidly coupled to the flow valve, and a solenoid disposed in fluid communication with the flow valve that is electrically controllable between an energized state and a de-energized state, (iii) a clutch disposable in fluid communication with the flow valve that is controllable between an applied position and an unapplied position, and (iv) a control circuit coupled to the at least one trim valve and the solenoid, may include de-energizing, by the control circuit, the solenoid to cause operation of the flow valve in the first position; fluidly coupling, by the flow valve, the at least one trim valve system with the clutch; coupling, by the clutch, the stator to ground when the clutch is in the applied position; and reducing an output speed of an output of the transmission when the stator is coupled to the ground.

In some embodiments, coupling the stator to the ground when the clutch is in the applied position may include locking the stator from rotating. Additionally, in some embodiments, the method may further include energizing, by the control circuit, the solenoid to cause operation of the flow valve in the second position; fluidly de-coupling, by the flow valve, the at least one trim valve system from the clutch to cause operation of the clutch in the unapplied position when the flow valve is in the second position; and de-coupling, by the clutch, the stator from the ground to allow the stator to rotate when the clutch is in the unapplied position.

In some embodiments, the method may further include modulating, by the control circuit, a fluid pressure provided to the clutch to slip the clutch and adjust a Kfactor characteristic of the fluid-coupling device. Additionally, in some embodiments, the transmission system may have a sensor coupled to the control circuit and configured to detect a rotational direction of an output of the transmission system, and the method may further include detecting, by the sensor, a rotational direction of the output; and controlling, by the control circuit, the clutch between the applied position and the unapplied position to reduce rotation of the output based on the detected rotational direction of the output. Finally, in some embodiments still, the transmission system may have a second clutch disposable in fluid communication with the flow valve, and the method may further include energizing, by the control circuit, the solenoid to cause operation of the flow valve in the second position; fluidly coupling, by the flow valve, the at least one trim system to the second clutch to cause application of the second clutch; and coupling, by the second clutch, the impeller and the turbine to one another in a lockup state.

According to yet another aspect of the present disclosure, a method of operating a transmission system, the transmission system including (i) a fluid-coupling device having an input coupled to an impeller, an output coupled to a turbine, and a stator disposed between the impeller and the turbine, (ii) an electro-hydraulic control system having a flow valve disposed in fluid communication with the input and the output of the fluid-coupling device that is movable between at least a first position and a second position, at least one trim valve system fluidly coupled to the flow valve, and a solenoid disposed in fluid communication with the flow valve that is electrically controllable between an energized state and a de-energized state, (iii) a clutch disposable in fluid communication with the flow valve that is controllable between an applied position and an unapplied position, and (iv) a control circuit coupled to the at least one trim valve and the solenoid, may include energizing, by the control circuit, the solenoid to cause operation of the flow valve in the second position; fluidly coupling, by the flow valve, the at least one trim system to the second clutch to cause application of the second clutch; coupling, by the second clutch, the impeller and the turbine to one another in a lockup state; and modulating, by the control circuit, a fluid pressure provided to the second clutch to slip the second clutch to reduce any vibrations from being transmitted by the output of the fluid-coupling device to an output of the transmission system.

In some embodiments, the method may further include allowing rotation of the stator when the solenoid is energized. Additionally, in some embodiments, the method may further include multiplexing, by the flow valve, hydraulic fluid such that hydraulic fluid is supplied to only one of the clutch and the second clutch to cause application of the only one of the clutch and the second clutch.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
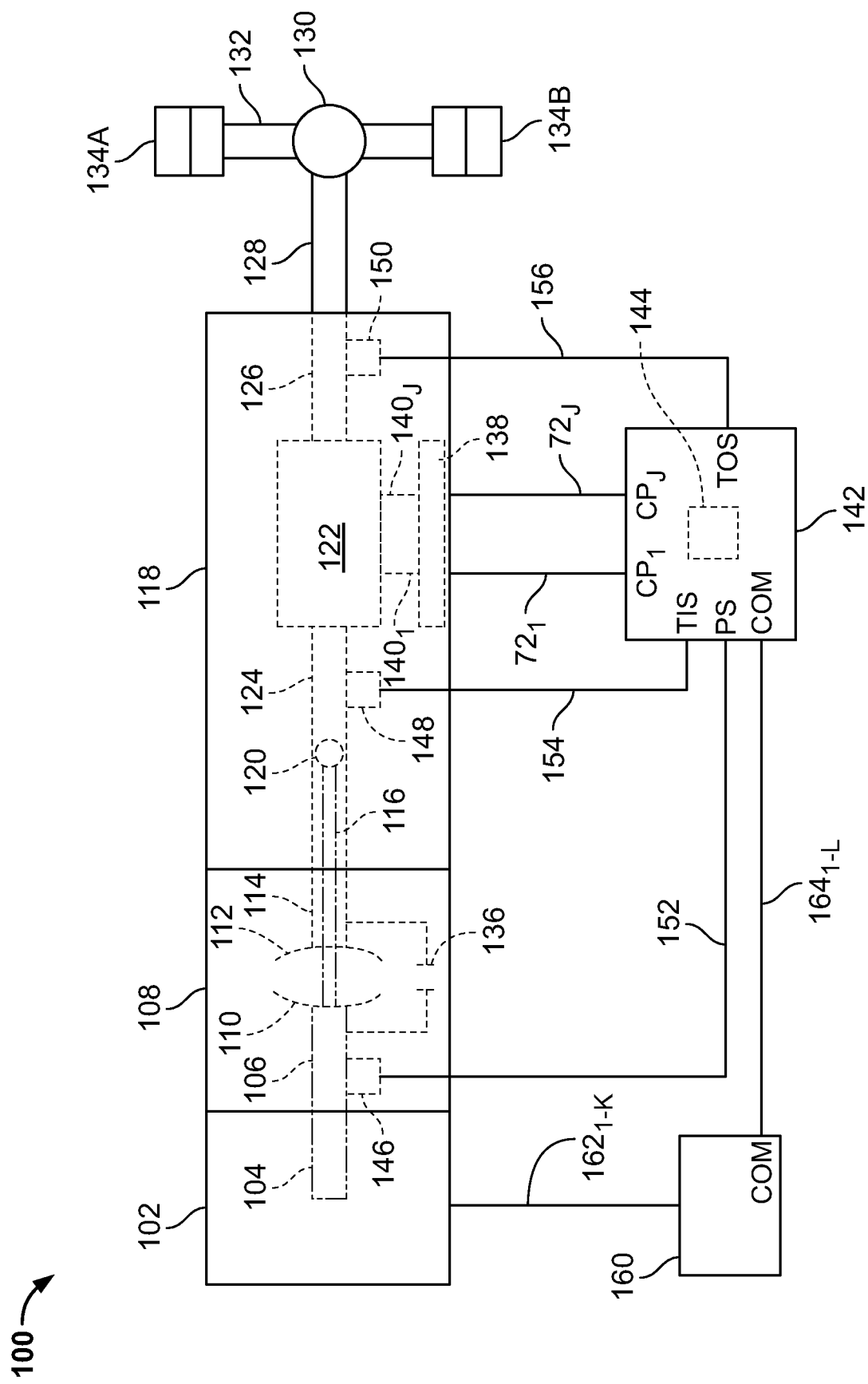
FIG. 1 is a block diagram and schematic view of one illustrative embodiment of a powered vehicular system.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C).

Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when torque multiplication is not needed. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, 1401-140J, where J may be any positive integer. The electro-hydraulic system 138 is responsive to control signals to selectively cause fluid to flow through one or more of the fluid paths, 1401-140J, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths 1401-140J.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed and direction of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, CP1-CPJ, of the transmission control circuit 142 via a corresponding number of signal paths 72₁-72J, where J may be any positive integer as described above. The actuators within the electro-hydraulic system 138 are each responsive to a corresponding one of the control signals, CP1-CPJ, produced by the transmission control circuit 142 on one of the corresponding signal paths 72₁-72J to control the friction applied by each of the plurality of friction devices by controlling the pressure of fluid within one or more corresponding fluid passageway 140₁-140J, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system 138 in a conventional manner. For example, the electro-hydraulic system 138 illustratively includes a conventional hydraulic positive displacement pump 120 which distributes fluid to the one or more friction devices via control of the one or more actuators within the electro-hydraulic system 138. In this embodiment, the control signals, CP1-CPJ, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a Society of Automotive Engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
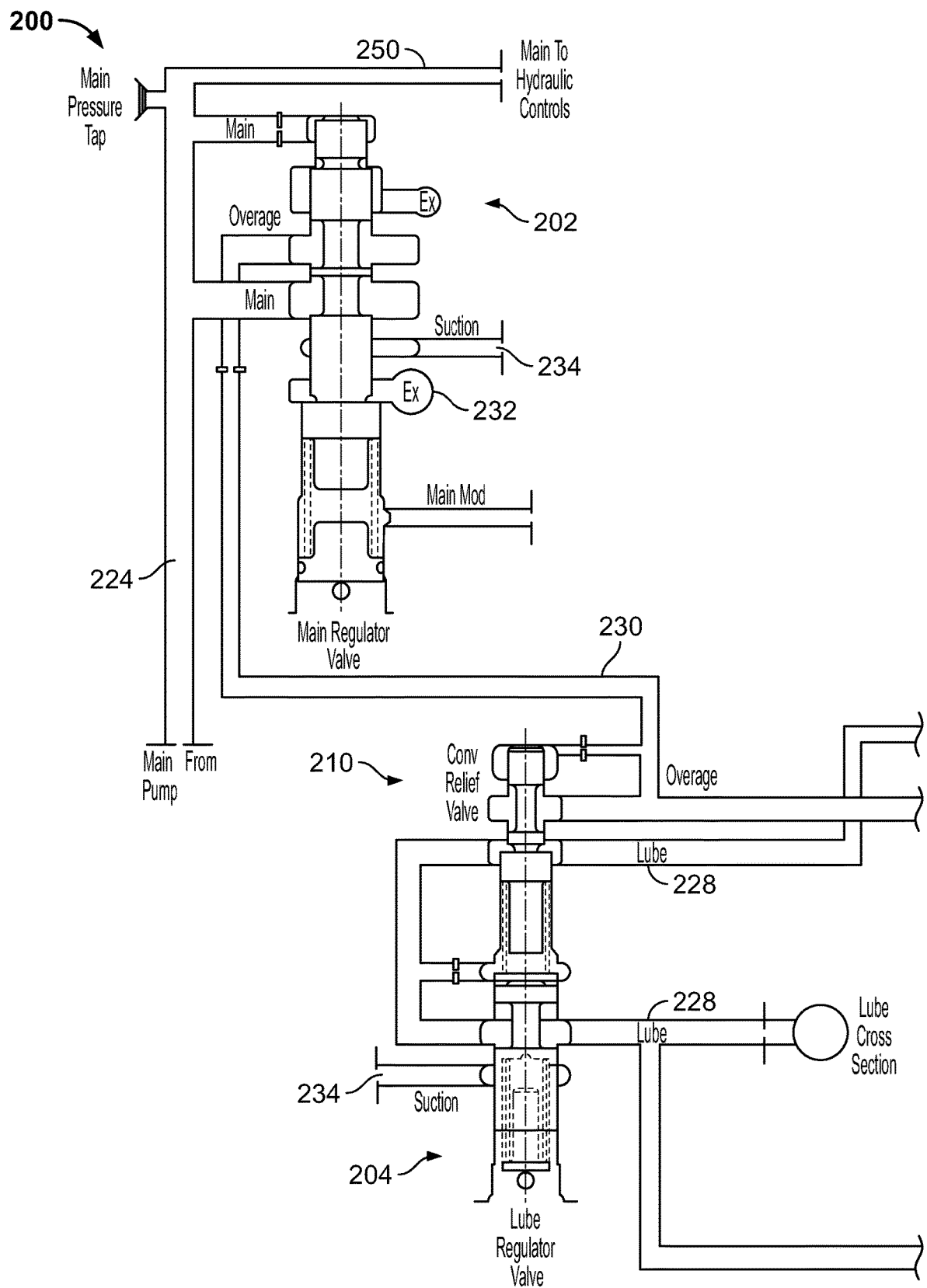
FIG. 2 is a schematic of a portion of a control system in a first mode.
Figure 2:
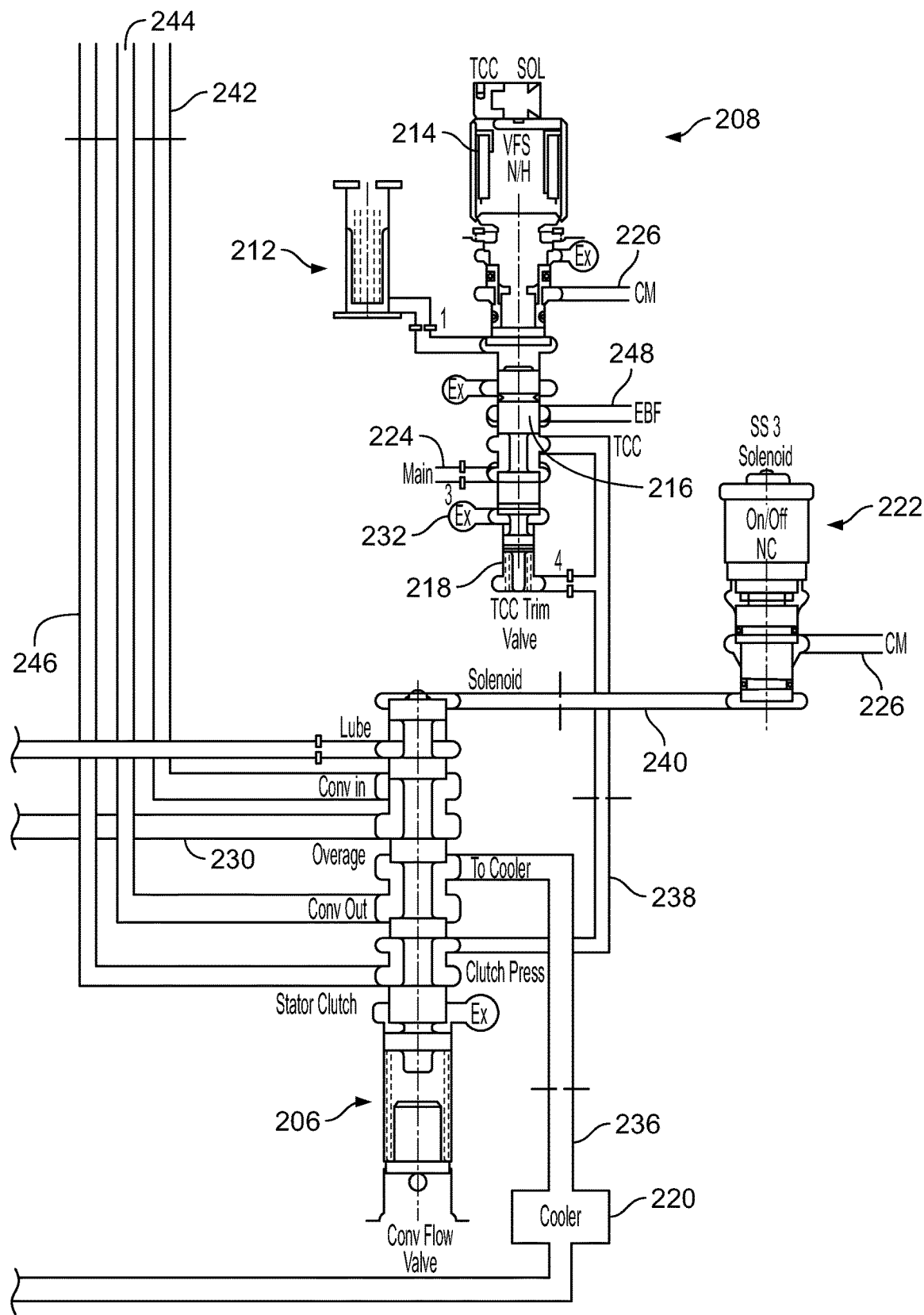

Referring to FIG. 2, a portion of a control system 200, i.e., electro-hydraulic system 138, is shown. In the system 200, a plurality of valves controlled hydraulically or electrically may be provided. For example, a regulator valve or main regulator valve 202 may be provided for controlling a main or control pressure throughout the system for actuating one or more of the valves. In the system 200, a main pressure 224 may be supplied by a pump such as the internal pump 120 of FIG. 1. In FIG. 2, the main pressure 224 may feed into one or more channels of the main regulator valve 202 for being fed into the rest of the system 200. Main pressure 224 may further flow through channel 250 for hydraulic actuation of solenoids, trim valves, and the like throughout the remainder of the electro-hydraulic system 138 not shown in FIG. 2.

The system 200 may also include a lube regulator valve 204, a converter flow valve 206, a converter relief valve 210 and an accumulator 212. While these valves are shown in FIG. 2, it is to be understood that this is only one of many possible examples of a control system. One or more of these valves may be disposed in a valve body or other support structure of the transmission. The function of these valves may be to regulate or control pressure to different portions of the system to control the functionality of the transmission. The lube regulator valve 204, for example, may control an amount of hydraulic pressure referred to as lube pressure. Lube pressure may be regulated to cool different components including clutches, brakes, and other fluid-coupling devices such as a torque converter.

The system 200 is also shown including a single trim valve system 208. The overall control system may include additional trim valve systems, and the single trim valve system 208 shown in FIG. 1 is representative of one of a plurality of trim systems in the control system. The trim valve system 208 may include an electric solenoid 214 and a trim valve 216. The solenoid 214 may comprise any conventional solenoid that is controllable via an electric current that either energizes or de-energizes the solenoid. The solenoid 214 may trigger movement of the trim valve 216 between a stroked position and a de-stroked position. When there is no pressure exerted against the trim valve 216, a return spring 218 may urge the trim valve 216 to its de-stroked position. When the solenoid 214 supplies sufficient pressure to the trim valve 216 to overcome the resistance of the spring 218, the trim valve 216 may move to its stroked position.

The control system 200 may also include a cooler 220 located in fluid communication with a fluid-coupling device such as a torque converter and the converter flow valve 206, as shown. In addition, an on/off solenoid 222 is disposed in fluid communication with the converter flow valve 206.

Figure 4:
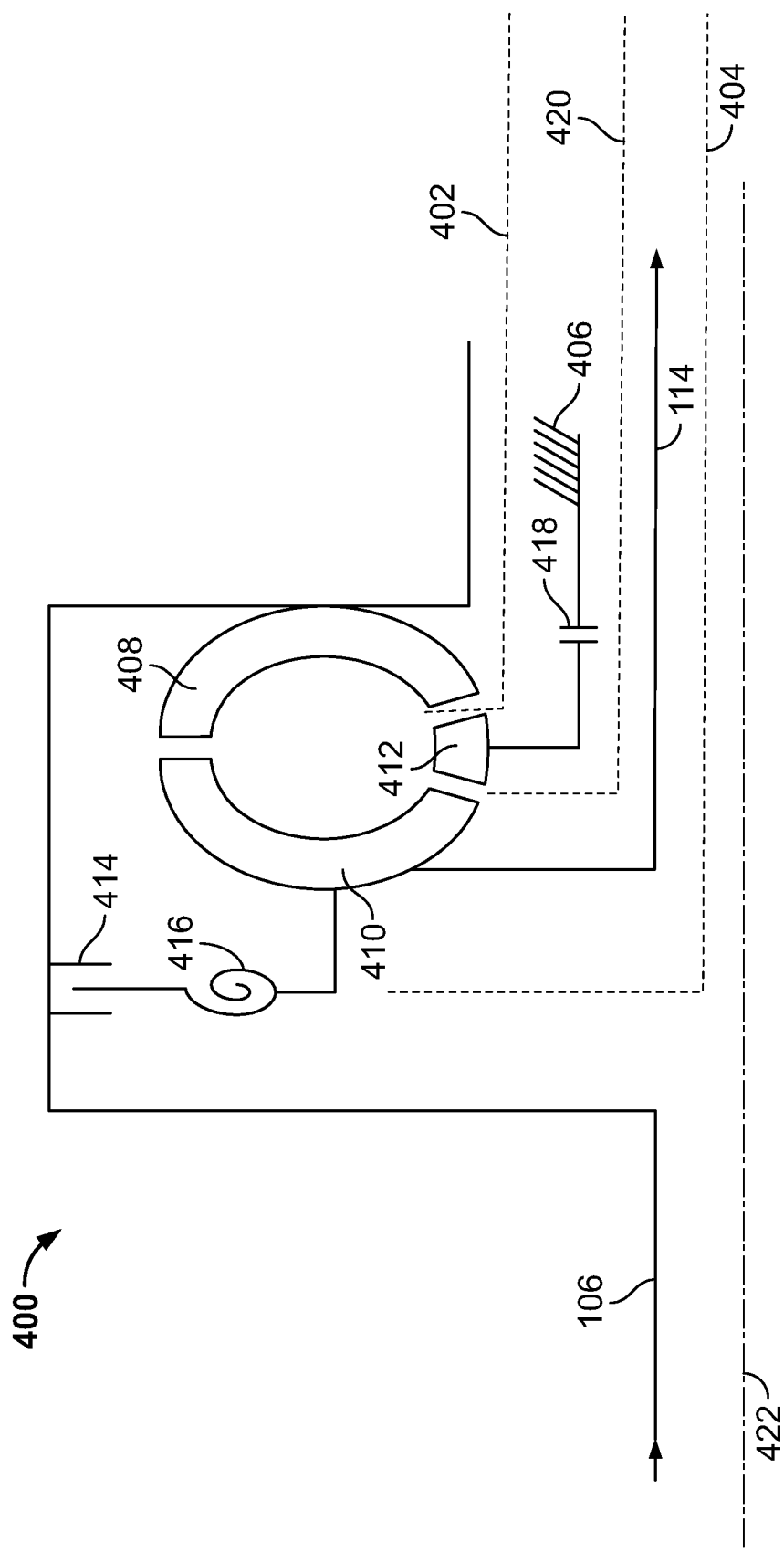
FIG. 4 is a schematic of a torque converter system.

As noted above, the control system 200 includes one or more valves disposed in fluid communication with a fluid-coupling device such as a torque converter. Referring to FIG. 4, one embodiment of a torque converter 400 is shown. In this embodiment, the torque converter 400 is illustrated with respect to a centerline 422 of a transmission. The converter 400 may include an input 402 and an output 404. In this example, the input 106 and output 114 are representative of a mechanical input and output, each of which define torque paths, with respect to the transmission. Hydraulic fluid may flow into the torque converter 400, i.e., referred to as "converter in" pressure, and hydraulic fluid may flow out of the converter 400, i.e., referred to as "converter out" pressure. In FIG. 4, for example, hydraulic fluid may flow into the torque converter as "converter in" pressure via hydraulic passage 402 and hydraulic fluid may flow out of the torque converter 400 as "converter out" pressure via hydraulic passage 404.

The torque converter 400 may include an impeller or pump 408 that is coupled to the pump shaft 106 and a turbine 410 which is coupled to the turbine shaft 114. A stator 412 may be disposed between the impeller 408 and the turbine 410, as shown. The torque converter 400 may include a damper or torsional isolator 416 for damping any torsional or vibration spikes in the converter. Further, a lockup clutch 414 may be provided for fluidly coupling the impeller 408 and turbine 410 to one another such that both rotate at approximately the same speed.

In the present embodiment of the converter 400 of FIG. 4, however, an additional clutch 418 is provided internally thereof. The clutch 418 may be referred to as a retardation clutch for purposes of this disclosure, but in effect it is a hydraulically-actuated clutch that is capable of being disposed in an applied or unapplied state. When applied, the clutch 418 can couple the stator 412 to ground 406 and effectively reduce the rotational speed of the turbine 410. The functionality of this retarding function will be further described below. Nevertheless, when the clutch 418 is unapplied, the stator 412 is capable of rotating in either a clockwise or counterclockwise direction. In many conventional fluid-coupling devices such as torque converters, a stator is provided but which is controlled by a one-way clutch. The one-way clutch in effect prevents the stator from rotating in two directions, i.e., the stator is capable of rotating in only a single direction. When the stator is locked or incapable of rotating, this is often referred to as a "converter" mode in which torque multiplication is achieved.

In the present disclosure, there is no one-way clutch. Instead, the retardation clutch 418 can be operably controlled such that it hydraulically "locks" or prevents the stator 412 from rotating. This is useful, as will be described in greater detail below, when a vehicle is ready to launch from an idle condition and a higher output torque at the rear wheels of the vehicle is desired. Moreover, this clutch 418 is capable of coupling the stator 412 to ground during a deceleration or braking event. As will be described, the retardation or retarder clutch 418 may also be useful for controlling rollback and varying a Kfactor of the torque converter.

Returning to FIG. 2, the additional retardation clutch 418 of the torque converter 400 may be operably controlled by hydraulic pressure that passes through the converter flow valve 206. In the schematic of FIG. 2, main pressure 224 may be supplied by a pump (internal or external) and a regulator valve 202 is capable of regulating pressure to different systems within the transmission. The regulator valve 202 includes one or more lands capable of directing fluid to at least a suction passage 234 and an overage passage 230. As described above, main pressure 224 is also capable of bypassing the regulator valve 202 and flowing directly to the hydraulic controls system 138 of the transmission via passage 250.

As main pressure 224 reaches a top portion of the valve 202, it may urge the regulator valve 202 to move or stroke so that fluid is allowed to enter the overage passage 230. As hydraulic fluid fills the overage passage 230, it flows to the converter relief valve 210 and the converter flow valve 206. Overage pressure 230 at the converter flow valve 206 is capable of flowing to the torque converter 400 via the converter in passage 242. As noted above, the converter in passage 242 may correspond with the input 402 of FIG. 4 in which the fluid flows to the impeller 408. Hydraulic fluid returning to the control system 200 from the torque converter 400 via its output 404 flows through the converter out passage 244, or hydraulic passage 404 of FIG. 4. Hydraulic fluid returning via the converter out passage 244 then flows through the converter flow valve 206 as shown in FIG. 2 so that it is directed to the cooler 220 via a "to cooler" passage 236. In this example, the control system 200 is operating in a "converter" mode in which the lockup clutch 414 is not applied. Here, the converter 400 functions in a torque multiplication mode and heat builds within the converter. Thus, this hot hydraulic fluid exits the torque converter 400 and flows through the converter flow valve 206 and to the cooler 220 where it is "cooled" via a conventional heat exchange operation.

Hydraulic fluid exiting the cooler 220 may flow to the lube regulator valve 204 via a lube passage 228. The lube regulator valve 204 may include one or more lands for controlling the flow of hydraulic fluid from a lube passage 228 to a suction passage 234.

In converter mode of FIG. 2, hydraulic fluid is also capable of flowing through the converter flow valve 206 to a retarder clutch passage 246 for hydraulically applying the retardation clutch 418. The retarder clutch passage 246 of FIG. 2 corresponds with fluid passage 420 of FIG. 4 as it relates to applying the retardation clutch 418 in converter mode. The manner in which this happens will now be described with reference to FIG. 2.

As described, the control system 200 includes a trim valve system 208 that includes a solenoid 214 and a trim valve 216. The trim valve 216 includes one or more valve lands to control where hydraulic fluid flows therefrom. For instance, the trim valve 216 may control fluid out of fluid passage 238 via an exhaust backfill passage 248 or into fluid passage 238 via a main fluid passage 224.

The solenoid 214 controls movement of the trim valve 216 as it is operably controlled between an energized state and a de-energized state. The solenoid 214 may function as a normally-open solenoid or a normally-closed solenoid. In the event of a normally-open solenoid, the solenoid is capable of outputting full pressure to the trim valve 216 in the event of an electrical malfunction with the transmission. Alternatively, in the event of a normally-closed solenoid, the solenoid does not supply any pressure to the trim valve 216 during an electrical malfunction or power loss. The operation of the solenoid 214 may further be controlled via a control main passage 226 which supplies hydraulic fluid from a control main valve (not shown) in which the control main pressure is less than main pressure.

In the converter mode, or also referred to as retardation mode, the on/off solenoid 222 is off and does not supply a signal pressure 240 to the converter flow valve 206. As shown, the solenoid 222 is also fluidly coupled to the control main passage 226, but since the solenoid 222 is not energized there is no signal pressure supplied to the converter flow valve 206 to cause it to move from its de-stroked position of FIG. 2. As such, trim pressure 238 from the trim valve system 208 is capable of flowing through the converter flow valve 206 and into the retarder clutch passage 246 (i.e., fluid passage 420) for applying the retardation clutch 418. This in effect causes the clutch 418 to apply and hold the stator 412 from rotating. For this example, the retardation clutch 418 is capable of holding the stator 412 so that the torque converter 400 can achieve torque multiplication.

Figure 3:
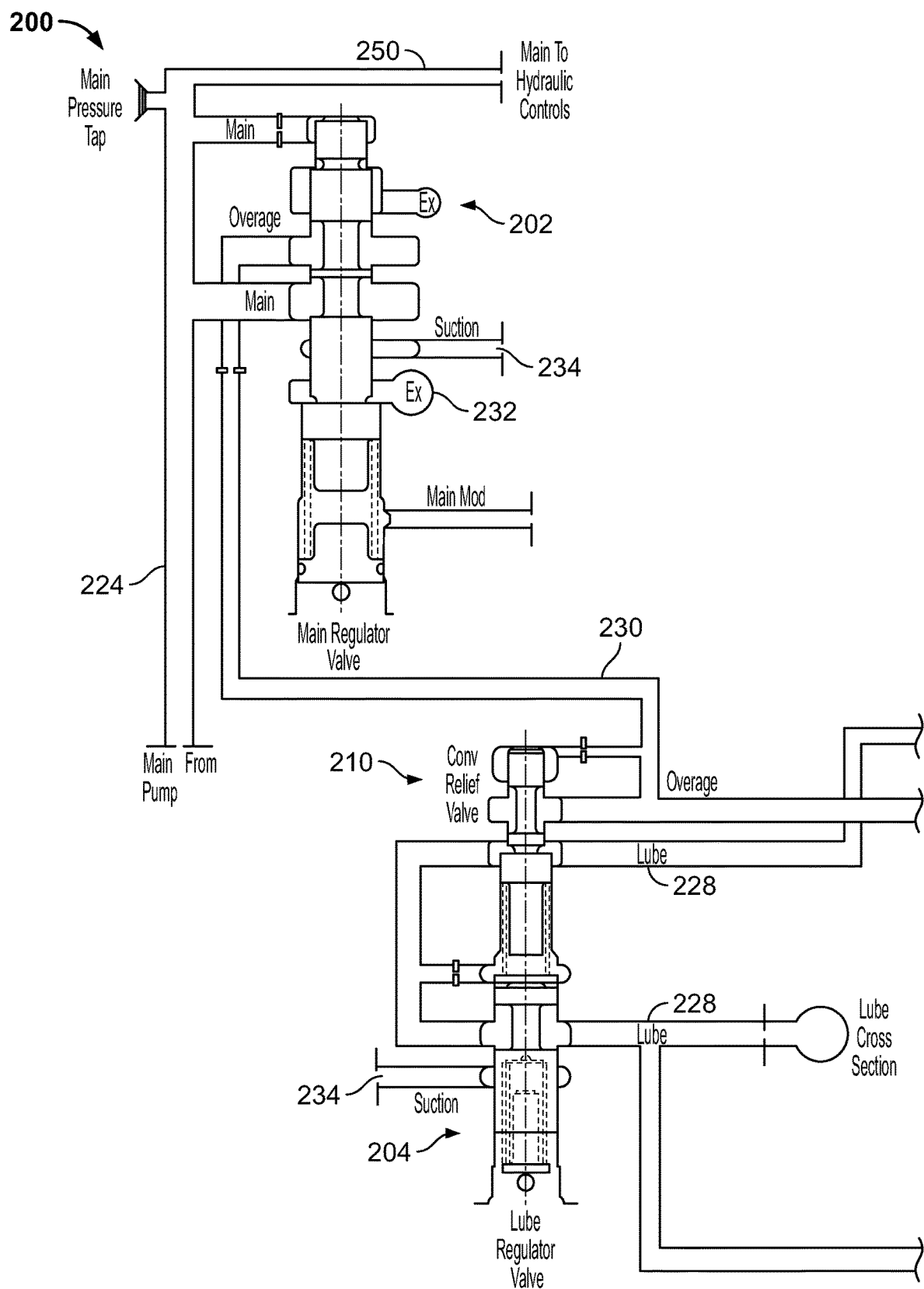
FIG. 3 is a schematic of the portion of the control system of FIG. 2 in a second mode.
Figure 3:
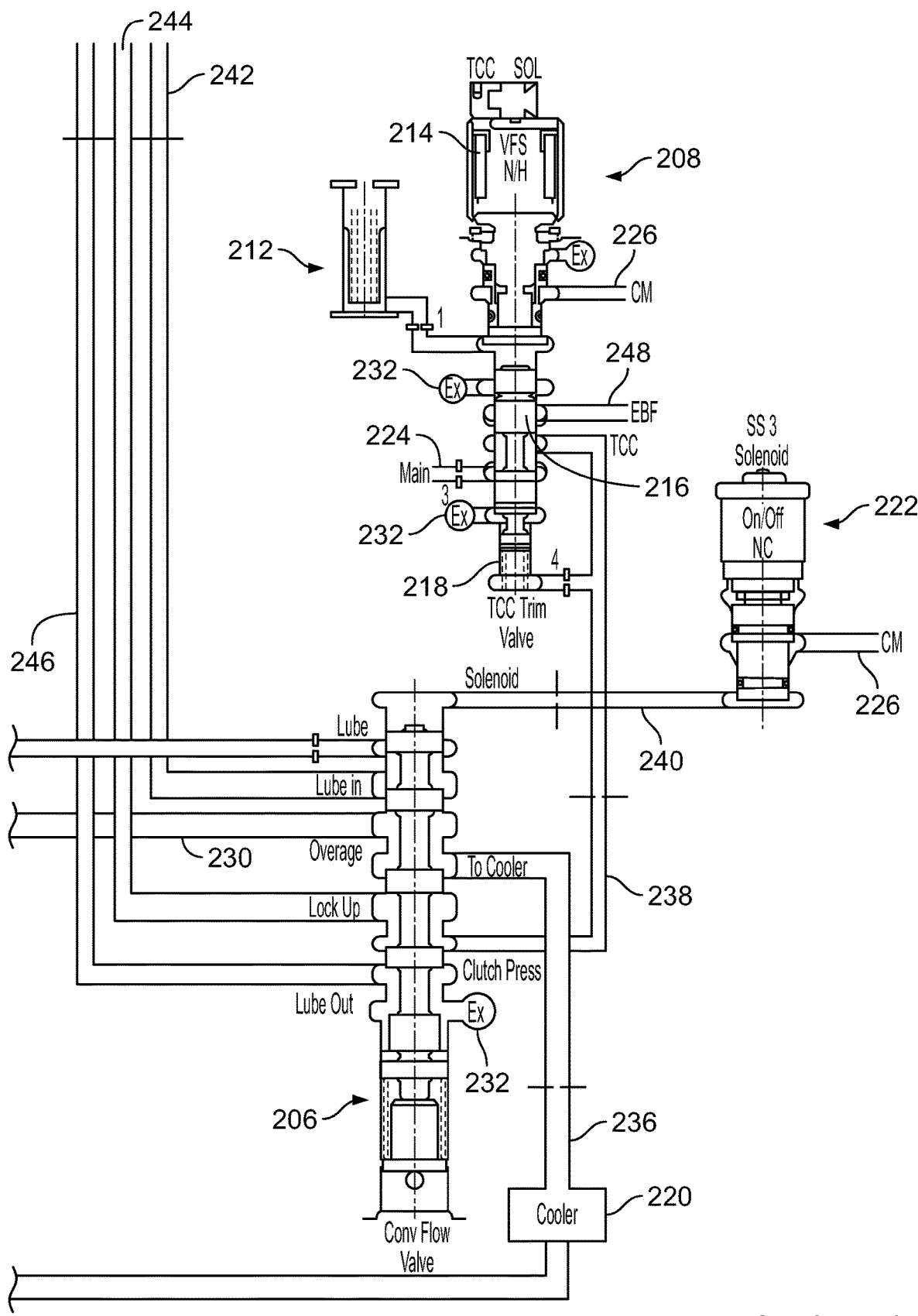

In FIG. 3, the control system is shown again but in a different mode. Here, the control system 300 is shown with the torque converter 400 operating in lockup mode. In this case, the on/off solenoid 222 is energized by the transmission control circuit 142, or other controller as the case may be, so that the solenoid 222 transfers hydraulic fluid via the signal passage 240 and urges the converter flow valve 206 to stroke. As the converter flow valve 206 moves to its stroked position of FIG. 3, the trim pressure 238 from the trim valve system 208 flows through the converter flow valve 206 again but goes through passage 244 to apply the lockup clutch 414. In FIG. 4, passage 244 corresponds with fluid passage 404. Hydraulic fluid exits the torque converter 400 through passage 246, which corresponds with fluid passage 420. Moreover, passage 242, i.e., fluid passage 402 in FIG. 4, is now fluidly coupled with the lube regulator valve 204 such that lube pressure via passage 228 flows into the converter 400 to assist with cooling.

As described with respect to FIGS. 2 and 3, the converter flow valve 206 is capable of controlling the actuation of the lockup clutch 414 and the retardation clutch 418. In other words, the converter flow valve is a multiplexing valve that is able to allow only one of the two clutches to engage at any one time. This multiplexing feature of the converter flow valve 206 allows for a cost savings as no additional valve is needed to control the retardation clutch, and plus it provides a safety feature in that only one of the two clutches can be engaged at one time.

Figure 5:
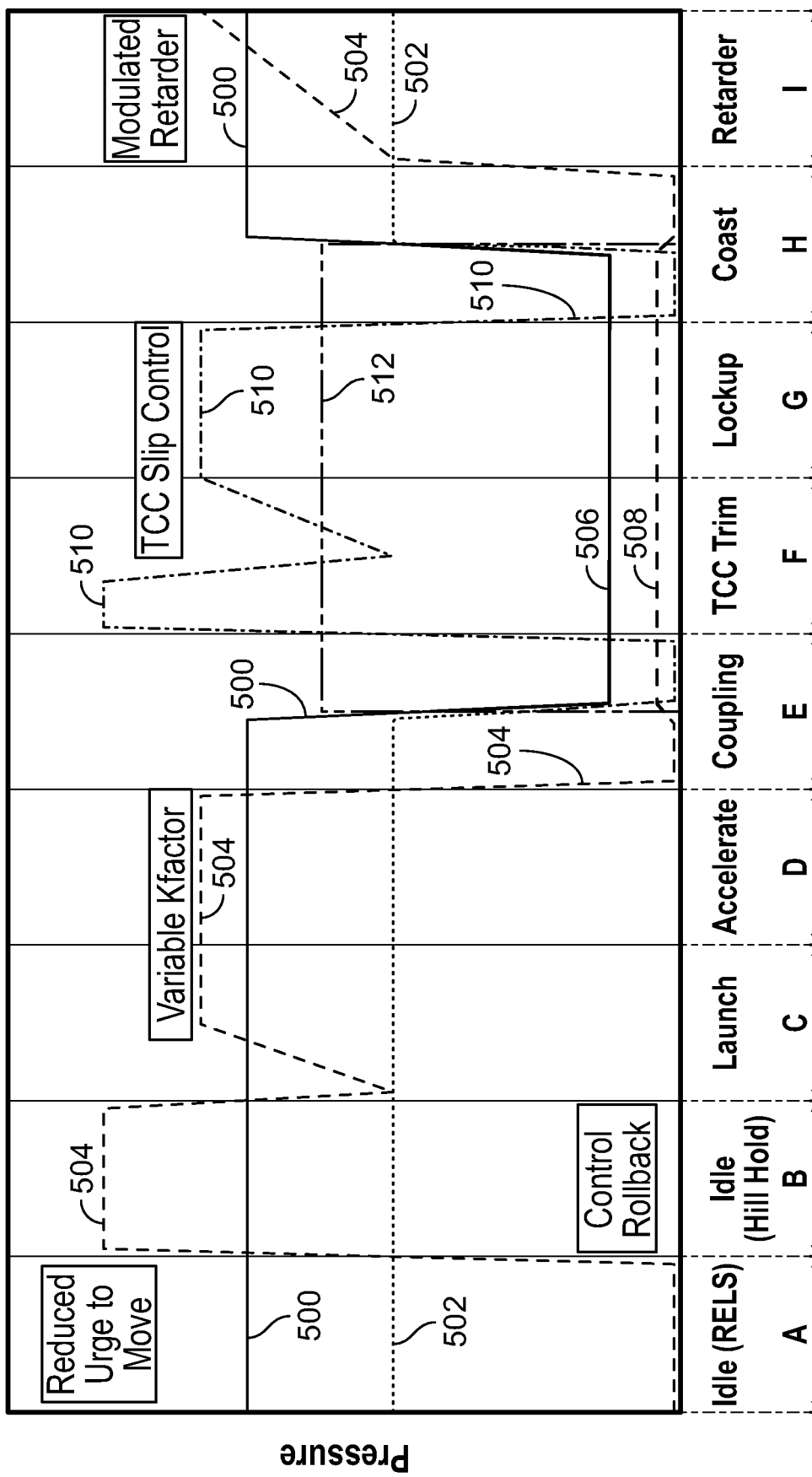
FIG. 5 is a diagram of a control system performance in the first and second modes of FIGS. 2 and 3.

Turning to FIG. 5, a graph is provided of different pressures over time based on different operational circumstances of a transmission having the control system 200 of FIG. 2 and the torque converter 400 of FIG. 4. Along the x-axis of FIG. 5, a plurality of different steps of operation or time periods are shown. In a first time period A, the engine is idling and the transmission is in converter mode. This may correspond with a reduced engine load at a stop, or "RELS", where converter in or overage pressure 500 is shown at a higher pressure than converter out pressure 502.

It is further noted in time period A that the retardation clutch 418 is unapplied. Thus, unlike conventional torque converters where a one-way clutch prevents the stator from rotating, the unapplied retardation clutch allows the stator 412 to freely rotate. In effect, during this time period, the load on the engine can be reduced.

In time period B, the transmission is operating in a hill hold condition or remains at idle. At this point, the transmission control circuit 142 or controller may de-energize the on/off solenoid 222 to allow the converter flow valve 206 to move to its de-stroked position. As a result, hydraulic fluid is directed through the trim pressure circuit 238 from the trim valve system 208 through the converter flow valve 206 and through the retardation clutch channel or circuit 246 for applying the retardation clutch 418. In FIG. 5, it is shown that the trim pressure 504 rises during this time when the converter flow valve 206 is de-stroked. By filling the retardation clutch 418, the stator 412 may be held from rotation and in effect the torque converter 400 is disposed in a conventional torque converter idle state where torque multiplication is available to launch the vehicle from idle. Moreover, the vehicle may be held still if idling on a hill or descent (i.e., hill hold capability).

Another feature of the retardation clutch is rollback control. In cases where a vehicle is idling on a hill or other descent, there may be a tendency for the vehicle to begin rolling backwards. This is particularly the case if the vehicle operator lets off the brake for a short period of time. With the retardation clutch, however, a control feature may be implement to reduce or prevent rollback even if the operator is not depressing the brake or otherwise braking the vehicle. To achieve rollback control, it may be desirable to utilize a Hall-Effect sensor for the output sensor 150. The Hall-Effect sensor 150 is capable of detecting rotational speed and direction. The sensor 150 may be in electrical communication with the transmission control circuit 142 and communicate both rotational speed and direction upon detecting such movement of the output shaft 126. If the transmission control circuit 142 receives a communication from the Hall-Effect sensor 150 that the output shaft 126 is rotating (either via detection of speed or direction, but particularly in a reverse direction being indicative of vehicle rollback), the transmission control circuit 142 may de-energize the on/off solenoid 222 so that the converter flow valve 206 moves to its de-stroked position.

With the converter flow valve 206 de-stroked, trim pressure 504 builds and hydraulic fluid fills the retardation clutch circuit 246 to apply the retardation clutch 418. With the retardation clutch 418 receiving hydraulic fluid, it may hold the stator 412 from rotating or allow the stator to slip as necessary to control rollback. In this manner, a closed-loop control is provided to prevent the vehicle from either rolling back when on a hill or creeping forward when otherwise not on a hill. In either case, the Hall-Effect sensor 150 detects rotational direction of the output shaft 126, communicates the same to the transmission control circuit 142, which then controls the application of the retardation clutch 418 to prevent or control rollback.

Moreover, the retardation clutch 418 can be controlled to slip such that the torque at the wheels of the vehicle can be reduced. Further, heat generation inside the torque converter can be reduced so that fuel economy benefits arise. Thus, the retardation clutch 418 is able to offer several benefits over conventional torque converters or fluid-coupling devices.

In time period C of FIG. 5, the vehicle operator may release the brake and is prepared to accelerate. This time period may be referred to as a launch step. During launch, it is shown in FIG. 5 that the trim pressure 504 may be modulated or varied to achieve a desirable performance of the torque converter 400. In effect, the modulation of trim pressure and thus retardation clutch pressure allows for a modification or variance of a Kfactor of the torque converter 400. Kfactor is a term used to measure torque converter performance, i.e., it describes how much a given engine may "rev up" during launch. Moreover, Kfactor is an intrinsic characteristic of a torque converter based on certain criteria such as blade angles on the impeller, turbine and stator, etc.

In many instances, a conventional torque converter has a characteristic that operates well with a given engine. For example, a first conventional torque converter may operate best with an engine having a peak torque at 1800 RPM. A second conventional torque converter, however, may operate best with an engine having a peak torque at 2500 RPM. It would not be desirable to swap engines, i.e., use the first conventional torque converter with the 2500 RPM engine or the second conventional torque converter with the 1800 RPM engine. The Kfactors of both torque converters dictate which engine the converter should be used with. This can become a dilemma with some transmission manufacturers who manufacture transmissions capable of operating behind many different engine types.

In the present disclosure, the use of the retardation clutch 418 and the ability to vary its pressure allows for less proliferation of torque converters for a given transmission manufacturer. Instead, a single torque converter (or, in some instances, a fewer number of converters) may be used behind any number of engine types due to the ability to modify the Kfactor to match any given engine. In addition, there are other benefits including improved emissions due to the adjustability of the Kfactor.

Figure 6:
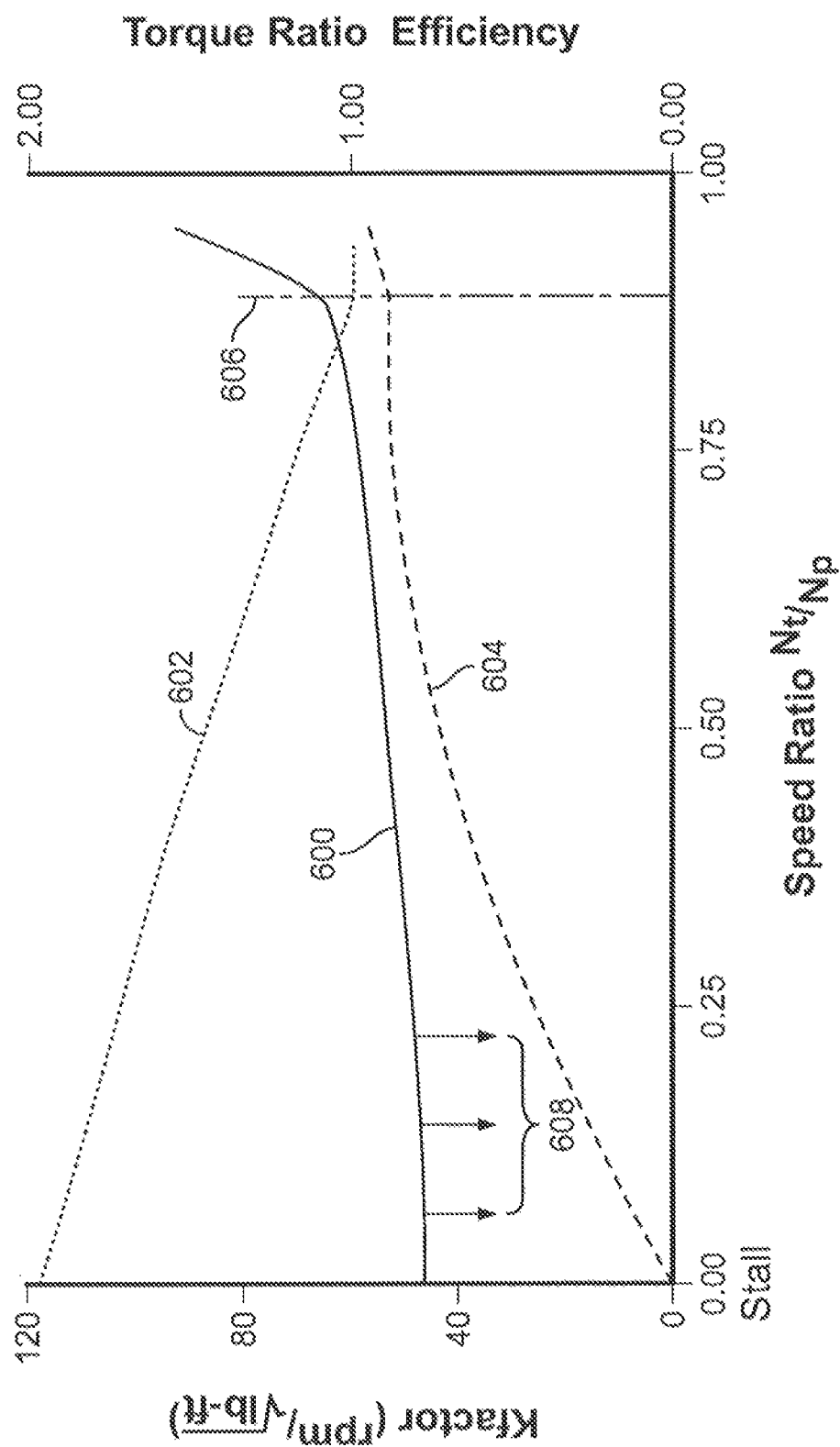
FIG. 6 is a diagram of a variable Kfactor control of a torque converter.

An example of a Kfactor curve 600 is shown in FIG. 6. In addition to the Kfactor curve 600, a torque ratio curve 602 and an efficiency curve 604 are shown. For purposes of this disclosure, torque ratio (TR) may be defined as follows:

$$TR = \frac{T_t}{T_p}$$

where $T_t$ refers to turbine torque and $T_p$ refers to pump torque. Efficiency (Eff) at the torque converter may be defined as follows:

$$Eff = SR \times TR$$

where SR is speed ratio. Kfactor is defined by the following equation:

$$Kfactor = \frac{N_p}{\sqrt{T_p}}$$

where $N_p$ refers to pump speed.

As shown, the Kfactor curve 600 remains substantially flat as speed ratio increases until it reaches a coupling point 606 on the graph. The coupling point 606 refers to when the stator 412 starts to rotate and there is a loss of torque multiplication across the impeller 408 and turbine 410. This will be describe below in further detail. At the coupling point 606, the Kfactor curve 600 rapidly increases while the torque ratio curve 602 begins to flat-line and the efficiency curve 604 remains substantially linear.

As described above, Kfactor may be varied or modulated by slipping the stator 412 and retardation clutch 418. In effect, the torque converter 400 becomes "looser" as a result, i.e., it is not operating under its best operating conditions, but it nevertheless allows the Kfactor curve 600 to shift downwards as shown by arrows 608 in FIG. 6. This decrease in Kfactor is also happening as engine speed increases and thus pump or impeller speed increases. Engine speed may then be reduced by locking or applying the retardation clutch 418 without modifying or changing turbine torque.

It is again worth noting that most conventional torque converters lock the stator during launch and the subsequent acceleration period D of FIG. 5.

In FIG. 5, the vehicle may accelerate during time period D. Here, the retardation clutch and stator may slip to adjust the Kfactor to a desired level, and thus trim pressure 504 is being received by the retardation clutch. Moreover, as described above, the on/off solenoid 222 is not receiving any electrical signal and thus there is no signal pressure 240 delivered to the converter flow valve 206.

At the coupling point 606, the trim pressure 504 reduces and the retardation clutch 418 may be unapplied. Here, the on/off solenoid is energized and transmits signal pressure to urge the converter flow valve 206 to its stroked position of FIG. 3. In FIG. 5, on/off solenoid or signal pressure 512 is shown increasing during the coupling time period. Moreover, the retardation clutch pressure is reduced so that the stator 412 is allowed to rotate. Further, lube pressure can flow into the converter passage to provide lube flow to the converter. In FIG. 5, a lube in curve 506 and a lube out curve 508 are shown.

Towards the end of the coupling time period, the converter flow valve 206 has stroked and hydraulic fluid begins to fill the lockup clutch circuit 244 in FIG. 3 and the lockup clutch 414 is applied. In FIG. 5, lockup clutch trim pressure 510 is shown during its fill phase of time period F. Once the lockup clutch is filled and applied, the torque converter 400 is operating in the lockup time period G of FIG. 5. Here, the turbine 410 and impeller 408 are effectively "locked" such that both rotate at substantially the same speed.

With the lockup clutch 414 applied, the multiplexed converter flow valve 206 prevents the retardation clutch 418 from being applied. In other words, the on/off solenoid 222 is energized and the converter flow valve 206 is in its stroked position of FIG. 3 such that the stator 412 is free to rotate with the impeller 408 and the turbine 410.

In lockup mode, it can be desirable to modulate an amount of slip across the lockup clutch 414 to account for noise, vibration and harshness ("NVH"). In doing so, the lockup trim pressure 510 may be varied to slip the lockup clutch 414 to remove any engine vibrations or torque oscillations from the engine. For example, if an injector plugs, a torque spike may be transferred to the torque converter 400. By slipping lockup trim pressure 510, however, the torque spike may be reduced and accounted for such that it does not get passed to the input shaft 124 of the transmission 118. Thus, a smoother torque is transmitted through the transmission 118 as a result.

In FIG. 5, the time period after lockup is time period H which may refer to a coasting condition. Here, the vehicle may be moving down a hill, for example. As shown, the lockup clutch trim pressure 510 may be reduced such that the lockup clutch 414 is disengaged. Moreover, the transmission control circuit 142 may de-energize the on/off solenoid 222 thereby inducing the converter flow valve 206 to return to its de-stroked position of FIG. 2. After the lockup clutch trim pressure 510 decreases in FIG. 5, the retardation clutch pressure begins to increase. As the retardation clutch is filled and applied, it slows the stator to help with retarding or braking the transmission output shaft 126 and thus slowing the vehicle. The transmission control circuit 142 can modulate the retardation clutch pressure so that the braking or retarding function is not abrupt. In effect, the transmission control circuit 142, or transmission controller, may operably control the slipping of the stator 412 to bring about the retardation function.

From the coasting time period, time period I refers to the retardation or retarding function. Again, the stator slips to control rotation speed of the transmission output to slow or maintain vehicle speed. As shown in FIG. 5, the trim pressure 504 increases to bring on the retardation clutch 418. Moreover, the converter in or overage pressure 500 and converter out pressure 502 increase as the torque converter 400 operates in its converter mode with the lockup clutch 414 disengaged.

During time period I, the stator 412 may rotate at substantially the same speed as the impeller 408. As the rotation speed of the stator 412 is reduced, it retards or slows the transmission output as described above. Thus, the retardation clutch 418 of FIG. 4 may perform the same function as a conventional retarder, but at a substantially less cost and with a conventional vehicle cooler and the existing transmission electro-hydraulic control system (with the addition of the on/off solenoid 222).

It is noted that the aforementioned embodiments are not intended to be limiting. The converter flow valve 206 is described as functioning as a multiplexed valve for controlling both the lockup clutch 414 and the retardation clutch 418. It is understood, however, that in an alternative embodiment the converter flow valve 206 may only control one of the two clutches. There may be an additional control valve for controlling hydraulic fluid to the other of the two clutches.

Moreover, in a further embodiment, the On/Off solenoid may be an electro-mechanical solenoid valve or any other known type of solenoid, valve, or combination thereof.

In another embodiment, the retardation clutch may be operably controlled by its own electro-hydraulic control system that includes one or more valves and/or solenoids.

In one embodiment of the present disclosure, a transmission system operably powered by a power-generating device includes a controller; a fluid-coupling device comprising an input, an output, an impellor, a turbine, and a stator, where the impeller is fluidly coupled to the input and the turbine is directly coupled to the output; a flow valve disposed in fluid communication with the input and the output of the fluid-coupling device, the flow valve being controllably moved between at least a first position and a second position; an electro-hydraulic control system comprising at least one trim valve system disposed in electrical communication with the controller and fluidly coupled to the flow valve; a solenoid of the electro-hydraulic control system disposed in electrical communication with the controller and fluid communication with the flow valve, the solenoid being electrically controlled between an energized state and a de-energized state; a clutch disposable in fluid communication with the control valve, the clutch being controllably actuated between an applied position and an unapplied position; wherein, in the energized state, the flow valve is disposed in its second position where it is not fluidly coupled to the clutch such that the clutch is in its unapplied position; wherein, in the de-energized state, the flow valve is disposed in its first position where it is fluidly coupled to the clutch such that the clutch is in its applied position; further wherein, in the applied position, the clutch operably couples the stator to ground.

In one example of this embodiment, the clutch is internally disposed within the fluid-coupling device. In a second example, and in the unapplied position, the stator is free to rotate. In a third example, a second clutch is disposable in fluid communication with the control valve, the second clutch being controllably actuated between an applied position and an unapplied position, wherein in the applied position the second clutch hydraulically couples the impeller to the turbine. In a fourth example, the flow valve is fluidly coupled to the first clutch in its first position and to the second clutch in its second position. In a fifth example, when the first clutch is applied the second clutch is unapplied, and when the second clutch is applied the first clutch is unapplied.

In a sixth example of this embodiment, the fluid-coupling device includes a Kfactor characteristic defined by a function of impeller speed and impeller torque, the Kfactor being adjustable by controllably modulating the clutch between its applied and unapplied positions. In a seventh example, the controller operably adjusts the Kfactor by operably slipping the stator. In another example, a sensor may be provided for detecting a rotational direction of a transmission output, the sensor being in electrical communication with the controller to communicate the rotational direction of the transmission output. In yet another example, the controller operably controls the solenoid between its energized and de-energized states based on the rotational direction of the transmission output. In a further example, and upon detection of a rotational movement of the transmission output corresponding to a reverse direction, the clutch is operably controlled between its applied and unapplied positions in order to reduce the rotational movement of the transmission output.

In another embodiment of the present disclosure, a method of controlling a transmission output of a transmission system includes providing a controller, a fluid-coupling device having an input, an output, an impeller, a turbine, and a stator, a flow valve controllably movable between a first position and a second position, an electro-hydraulic control system comprising at least one trim valve system disposed in electrical communication with the controller and fluidly coupled to the flow valve, a solenoid of the electro-hydraulic control system disposed in electrical communication with the controller and fluid communication with the flow valve, and a clutch disposable in fluid communication with the control valve; de-energizing the solenoid by the controller; disposing the flow valve in its first position; fluidly coupling the at least one trim valve system with the clutch via the flow valve in the first position; hydraulically applying the clutch; coupling the stator to ground when the clutch is applied; and reducing an output speed of the transmission output when the stator is coupled to ground.

In a first example of this embodiment, the method may include locking the stator from rotating when the clutch is applied. In a second example, the method may include allowing the stator to rotate when the clutch is unapplied. In a third example, the method may include unapplying the clutch when the solenoid is energized. In a fourth example, the method may include unapplying the clutch when the flow valve is in its second position. In a fifth example, the method may include energizing the solenoid by the controller to move the flow valve from its first position to its second position.

In a sixth example, the method may include applying the clutch to achieve torque multiplication between the impeller and turbine. In a seventh example, the method may include slipping the stator by modulating the clutch between its applied position and unapplied position. In an eighth example, the method may include varying a Kfactor characteristic of the fluid-coupling device during the slipping step. In a ninth example, the method may include providing a sensor in electrical communication with the controller; detecting a rotational direction of the transmission output by the sensor; communicating the rotational direction to the controller; controllably actuating the clutch between its applied and unapplied positions to reduce any rotation of the transmission output.

In another example, the method may include providing a second clutch disposable in fluid communication with the flow valve; energizing the solenoid to unapply the clutch and move the flow valve to its second position; fluidly coupling the flow valve to the second clutch; hydraulically actuating the second clutch from an unapply position to an apply position; and coupling the impeller and turbine to one another in a lockup state by the second clutch. In yet another example, the method may include multiplexing the flow valve to allow only the first clutch or the second clutch to be in their apply position.

In a further embodiment of the present disclosure, a method of controlling a transmission output of a transmission system includes providing a controller, a fluid-coupling device having an input, an output, an impellor, a turbine, and a stator, a flow valve controllably movable between a first position and a second position, an electro-hydraulic control system comprising at least one trim valve system disposed in electrical communication with the controller and fluidly coupled to the flow valve, a solenoid of the electro-hydraulic control system disposed in electrical communication with the controller and fluid communication with the flow valve, a first clutch and a second clutch disposable in fluid communication with the control valve; energizing the solenoid by the controller; disposing the flow valve in its second position; hydraulically applying the second clutch with hydraulic fluid from the flow valve; coupling the impeller and turbine to one another in a lockup state by the second clutch; modulating the second clutch between an applied position and an unapplied position; and slipping the second clutch during the modulating step to reduce any vibrations from being transmitted by the output of the fluid-coupling device to the transmission output.

In one example of this embodiment, the method may include allowing the stator to freely rotate when the solenoid is energized. In another example, the method may include maintaining the first clutch in an unapplied position while the second clutch is in its applied position. In a further example, the method may include multiplexing hydraulic fluid via the flow valve between the first clutch and the second clutch so only one of the first and second clutches is in its respective applied position While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A transmission system comprising:
 a fluid-coupling device coupled between a drive unit and a transmission, the fluid-coupling device including an input coupled to an impeller, an output coupled to a turbine, and a stator disposed between the impeller and the turbine;
 an electro-hydraulic control system configured to distribute hydraulic fluid to a plurality of friction devices, the electro-hydraulic control system including a flow valve disposed in fluid communication with the input and the output of the fluid-coupling device that is movable between at least a first position and a second position, at least one trim valve system fluidly coupled to the flow valve, and a solenoid disposed in fluid communication with the flow valve that is electrically controllable between an energized state and a de-energized state;
 a clutch disposable in fluid communication with the flow valve, the clutch being controllable between an applied position and an unapplied position; and
 a control circuit disposed in electrical communication with the at least one trim valve system and the solenoid, the control circuit configured to control operation of the solenoid between the energized state and the de-energized state,
 wherein when the solenoid is controlled in the energized state by the control circuit, the flow valve is disposed in the second position such that the flow valve is de-coupled from the clutch and the clutch is in the unapplied position,
 wherein when the solenoid is controlled in the de-energized state by the control circuit, the flow valve is disposed in the first position such that the flow valve is fluidly coupled to the clutch and the clutch is in the applied position,
 and wherein when the clutch is in the applied position, the clutch resists rotation of the stator.

2. The transmission of claim 1, wherein when the clutch is in the unapplied position, the stator is free to rotate.

3. The transmission system of claim 1, wherein the clutch is internally disposed in the fluid-coupling device and the fluid-coupling device includes a second clutch disposable in fluid communication with the flow valve.

4. The transmission system of claim 3, wherein the second clutch is controllable between an applied position, in which the second clutch couples the impeller and the turbine to one another for rotation at approximately the same speed, and an unapplied position, in which the impeller and the turbine are not coupled to one another by the second clutch for rotation at approximately the same speed.

5. The transmission system of claim 4, wherein the flow valve is a multiplexing valve that allows operation of only one of the clutch and the second clutch in the applied position at any one time.

6. The transmission system of claim 5, wherein when the flow valve is disposed in the first position, the second clutch is in the unapplied position.

7. The transmission system of claim 6, wherein when the flow valve is disposed in the second position, the second clutch is in the applied position.

8. The transmission system of claim 1, wherein the fluid-coupling device has a Kfactor characteristic that is g function of a speed of the impeller and a torque of the impeller during operation of the fluid-coupling device, and wherein the control circuit is configured to modulate fluid pressure provided to the clutch to adjust the Kfactor characteristic.

9. The transmission system of claim 8, wherein the control circuit is configured to slip the clutch to adjust the Kfactor characteristic.

10. The transmission system of claim 1, further comprising a sensor coupled to the control circuit and configured to detect a rotational direction of an output of the transmission system, wherein the control circuit is configured to control the solenoid between the energized state and the de-energized state based on the rotational direction of the output detected by the sensor.

11. The transmission system of claim 10, wherein in response to detection of a reverse rotational direction of the output by the sensor, the control circuit is configured to control the solenoid between the energized state and the de-energized state to control operation of the clutch between the applied position and the unapplied position in order to reduce rotational movement of the output.

12. A method of operating a transmission system, the transmission system including a fluid-coupling device having an input coupled to an impeller, an output coupled to a turbine, and a stator disposed between the impeller and the turbine, an electro-hydraulic control system having a flow valve disposed in fluid communication with the input and the output of the fluid-coupling device that is movable between at least a first position and a second position, at least one trim valve system fluidly coupled to the flow valve, and a solenoid disposed in fluid communication with the flow valve that is electrically controllable between an energized state and a de-energized state, a clutch disposable in fluid communication with the flow valve that is controllable between an applied position and an unapplied position, and a control circuit coupled to the at least one trim valve system and the solenoid, the method comprising:

de-energizing, by the control circuit, the solenoid to cause operation of the flow valve in the first position;

fluidly coupling, by the flow valve, the at least one trim valve system with the clutch to cause operation of the clutch in the applied position when the flow valve is in the first position;

coupling, by the clutch, the stator to ground when the clutch is in the applied position; and reducing an output speed of an output of the transmission system when the stator is coupled to the ground.

13. The method of claim 12, wherein coupling the stator to the ground when the clutch is in the applied position comprises locking the stator from rotating.

14. The method of claim 12, further comprising:

energizing, by the control circuit, the solenoid to cause operation of the flow valve in the second position;

fluidly de-coupling, by the flow valve, the at least one trim valve system from the clutch to cause operation of the clutch in the unapplied position when the flow valve is in the second position; and de-coupling, by the clutch, the stator from the ground to allow the stator to rotate when the clutch is in the unapplied position.

15. The method of claim 12, further comprising:

modulating, by the control circuit, a fluid pressure provided to the clutch to slip the clutch and adjust a Kfactor characteristic of the fluid-coupling device.

16. The method of claim 12, wherein the transmission system has a sensor coupled to the control circuit and configured to detect a rotational direction of the output of the transmission system, the method further comprising:

detecting, by the sensor, the rotational direction of the output of the transmission system; and controlling, by the control circuit, the clutch between the applied position and the unapplied position to reduce rotation of the output based on the detected rotational direction of the output.

17. The method of claim 12, wherein the transmission system has a second clutch disposable in fluid communication with the flow valve, the method further comprising:

energizing, by the control circuit, the solenoid to cause operation of the flow valve in the second position;

fluidly coupling, by the flow valve, the at least one trim system to the second clutch to cause application of the second clutch; and coupling, by the second clutch, the impeller and the turbine to one another in a lockup state.

18. A method of operating a transmission system, the transmission system including a fluid-coupling device having an input coupled to an impeller, an output coupled to a turbine, and a stator disposed between the impeller and the turbine, an electro-hydraulic control system having a flow valve disposed in fluid communication with the input and the output of the fluid-coupling device that is movable between at least a first position and a second position, at least one trim valve system fluidly coupled to the flow valve, and a solenoid disposed in fluid communication with the flow valve that is electrically controllable between an energized state and a de-energized state, a clutch disposable in fluid communication with the flow valve that is controllable between an applied position and an unapplied position, a second clutch disposable in fluid communication with the flow valve, and a control circuit coupled to the at least one trim valve system and the solenoid, the method comprising:

energizing, by the control circuit, the solenoid to cause operation of the flow valve in the second position;

allowing bi-directional rotation of the stator when the solenoid is energized;

fluidly coupling, by the flow valve, the at least one trim system to the second clutch to cause application of the second clutch;

coupling, by the second clutch, the impeller and the turbine to one another in a lockup state; and modulating, by the control circuit, a fluid pressure provided to the second clutch to slip the second clutch to reduce any vibrations from being transmitted by the output of the fluid-coupling device to an output of the transmission system.

19. The method of claim 18, further comprising multiplexing, by the flow valve, hydraulic fluid such that hydraulic fluid is supplied to only one of the clutch and the second clutch to cause application of the only one of the clutch and the second clutch.

* * * * *